United States Patent [19]

Iseli et al.

[11] 3,805,241

[45] Apr. 16, 1974

[54] CIRCUIT ARRANGEMENT FOR THE UNDISTURBED TRANSMISSION AND STORAGE OF ELECTRICAL INFORMATION SIGNALS AT A REMOTE CONTROL INSTALLATION

[75] Inventors: Jakob Iseli, Gbenstorf; Georges Tenchio, Staufen, both of Switzerland; Dieter Schulz, Hannover, Germany

[73] Assignee: Sprecher & Schuh AG, Aarau, Switzerland

[22] Filed: May 3, 1973

[21] Appl. No.: 356,746

[30] Foreign Application Priority Data

May 5, 1972 Switzerland........................ 6703/72

[52] U.S. Cl................................ 340/147 R, 178/69

[51] Int. Cl........................... H04q 9/00, H041 25/02

[58] Field of Search....... 340/147 R, 164 R; 178/69; 317/22 R

[56] References Cited

UNITED STATES PATENTS

| | | | |
|---|---|---|---|
| 3,452,155 | 6/1969 | Stanley | 340/147 R X |
| 3,456,079 | 7/1969 | Wallace, Jr. | 178/69 R |

*Primary Examiner*—Donald J. Yusko
*Attorney, Agent, or Firm*—Eric H. Waters

[57] ABSTRACT

A circuit arrangement for the undisturbed transmission and storage of electrical information signals at a remote control installation containing addressed transmitter and receiver means possessing addressed remanent intermediate storage means and which by means of conductors are connected with a central control unit having a logic circuit for the delivery of address signals and for the further transmission of the information signals received by the transmitters to the remanent intermediate storages of the receivers. A current detector is connected with each of the signal-carrying conductors of the remote control installation, the conductors being terminated at their ends by their characteristic impedance. A boundary value indication as well as an OR- logical coupling is provided for the output signals of the current detectors in order to obtain a pulse-shaped disturbance signal as soon as in only one of the aforementioned conductors the current intensity passes a lower or upper boundary value. A controllable electronic switch is connected in circuit with the supply conductor for the remanent intermediate storage of the receiver and there is provided for the electronic switch as for the logic circuit of the central control unit a control circuit influenced by the disturbance signals and by means of which control circuit and through the action of a disturbance signal the supply conductor is temporarily short-circuited by the electronic switch and via the logic circuit at the central control unit there is interrupted the delivery of the address signals and the further transmission of the information signals.

13 Claims, 9 Drawing Figures

CIRCUIT ARRANGEMENT FOR THE UNDISTURBED TRANSMISSION AND STORAGE OF ELECTRICAL INFORMATION SIGNALS AT A REMOTE CONTROL INSTALLATION

BACKGROUND OF THE INVENTION

The present invention relates to a new and improved circuit arrangement for the undisturbed transmission and storage of electrical information signals at a remote control installation in which addressed transmitters, and receivers possessing addressed remanent intermediate stores or storages, are connected by lines or conductors with a central control unit and the central control unit possesses a logic circuit for the delivery of address signals and for the further transmission of information signals obtained from the transmitters to the remanent intermediate stores of the receivers.

Devices for the transmission of digital information signals must possess high operational reliability and there must be completely eliminated the possibility that owing to some type of influence the transmission of the signals and also the intermediate storage thereof is disturbed in such a way that the signals are completely suppressed or signals additionally generated. Different techniques have been developed to obtain the requisite operational reliability for such transmission systems. Known measures which have been employed are, for instance, the use of security codes and answer back-checking installations. The transmission of electrical digital information signals over lines or conductors is especially susceptible to electrical influence from the regions around the conductors, by means of which voltages and currents are induced in the conductors which, when possessing sufficient intensity, can completely falsify the transmitted information signals.

Remote control installations with transmission of digital information signals for the purpose of controlling different devices oftentimes are also employed in industrial installations. It can happen that the conductors which are grouped together into a cable are laid over a relatively long distance and over part of such distance there extend, parallel to the cable, for instance high current-high voltage lines, by means of which disturbance currents are induced in the conductors. A known technique for preventing such disturbances during the transmission of analog signals resides in the technique of using the transmission conductor as an antenna at which the disturbance signals caused in this way in the conductor are quantitatively determined, and from the derived disturbance signal there is formed a correction signal phase-shifted through 180° and which is then additively superimposed upon the useful signal which has associated therewith the disturbance. Such correction can be also employed during the transmission of digital information signals. In many instances, however, such as for instance in the case of high current-high voltage conductors which extend parallel to the signal carrying lines, this correction is not sufficient since the induced disturbance signals can be of such intensity that by virtue thereof non-addressed receivers are switched and erroneous information intermediately stored.

SUMMARY OF THE INVENTION

It is a primary object of the present invention to provide a new and improved construction of circuit arrangement for remote control installations of the aforementioned general type, which, even with extremely pronounced scattering or leakage of disturbance signals, insures for undisturbed transmission and storage of digital information signals.

A circuit arrangement by means of which the aforementioned object, and others which will become more readily apparent as the description proceeds, can be realized is manifested by the features that at each of the signal-conducting conductors of the remote control installation, each of which is terminated at its ends by its characteristic impedance, there is connected a current detector. For the output signals of the current detectors there is provided a boundary value indication as well as an OR-logic switching operation in order to obtain a pulse-like disturbance signal, as soon as in only one of the aforementioned conductors the current intensity exceeds a lower or upper boundary value. In the supply conductor for the remanent intermediate storage of the receiver, there is connected a controllable electronic switch and for the latter as well as for the logic circuit of the central control unit there is provided a control circuit influenced by the disturbance signals via which control circuit by means of a disturbance signal the supply conductor is briefly closed by the electronic switch and by means of the logic circuit there is interrupted at the central control unit the delivery of the address signals and the further transmission of the information signals.

Due to the circuit arrangement of the invention, there is accordingly realized upon the presence of a disturbance that, by means of the leading edge of the disturbance signal which indicates the disturbance, the current detectors at the remote control installation are abruptly stopped from transmitting the signals and the power supply to the storages is interrupted, so that even extremely pronounced disturbances cannot have any influence upon the signal transmission. Further, the information which has been stored at the storages remains since with appropriately dimensioned remanent intermediate storages the amplitude and duration, even of the most intensive disturbance currents which occur in practice, is not sufficient to switch the intermediate storages. After the disturbance has decayed or died down, then the circuit arrangement becomes ineffectual and the remote control installation again assumes its normal operation. Due to this switching-off of the remote control installation for the duration of the disturbance, there is insured for absolutely positive signal transmission.

In order to insure that upon re-switching-in of the remote control installation the activation time of the permanent intermediate storages, during which time no new information can be stored, is taken into account and that there is insured in the most simple manner the correct cyclic or clocked resumption of the operation of the system, it is possible for the circuit arrangement to contain a monostable trigger stage which can be retriggered with each disturbance signal, and the time-constant of which is not smaller than the activation time of the remanent intermediate storages. Further, by means of the leading edge or flank of the output signal the monostable trigger stage of the electronic switch can be controlled to short-circuit the storage supply and the logic circuit can be controlled to block the further transmission of the information signals and to block the delivery of information signals, whereas switching-in again of the storage supply and the elimination of the blocking action for the information signals and the address signals can be controlled by switching means which respond to the rear edge or flank of the output signals of the monostable trigger stage.

For a remote control installation, at the central control unit of which there is obtained from clock pulses counting pulses for an address counter, it is possible at the circuit arrangement to generate the trigger pulses for the monostable trigger stage by a conjuctive logical coupling of the disturbance signal with the clock pulses of the central control unit at a logic circuit arranged forwardly of the monostable trigger stage. Further the switching means responding to the rear edges or flanks of the output signals of the monostable trigger stage can be controlled by the address-counting pulses. These address-counting pulses can be delivered to the central control unit via a conjunctive logic circuit which is coupled with the output of the monostable trigger stage and blocked by its output signal for the throughpassage of the address-counting pulses. Such design of the components of the circuit arrangement which controls the delivery of the address signals is particularly simple for high operational efficiency. In a remote control installation in which further transmission of the information signals occurs by virtue of reading signals associated therewith and the reading signals are obtained at the central control unit from clock pulses, it is equally possible for the circuit component of the circuit arrangement which controls the further transmission of the information signals to be designed in a likewise effective and cost-saving manner in that the clock pulses for producing the reading signals are delivered via a conjunctive logic circuit connected with the output of the monostable trigger stage and which is blocked by its output signals for the throughpassage of the clock pulses.

It can happen that a disturbance lasts for an impermissibly long period of time, so that due to the automatic switching-off and switching-on of the remote control installation, disturbances in operation can arise. In order to eliminate operational disturbances caused for these reasons, it is possible to connect an alarm circuit to the control circuit, this alsrm circuit containing a time switching element, preferably a monostable trigger stage combined with a low-pass filter arrangement and responding to control signals for the electronic switch, in order to deliver an alarm signal whenever there occurs short-circuiting of the storage supply which lasts longer than a predetermined time. As the electronic switch for the switching-on and switching-off of the storage supply, there is preferably employed a transistorized power amplifier having a push-pull stage. Since under circumstances it can happen that with too sudden switching-in again of the storage supply, through over-response in the conductor of the current detectors there is reported a disturbance which is actually not present, it is advantageous to permit the storage supply voltage to slowly increase when carrying out such re-switching-in operation. To this end, there can be provided at a power amplifier an RC-element which, for the purpose of flattening only the ascending edge of the amplifier output signal, is coupled via a diode with the final stage of the one amplifier branch.

To save-on switching components and for realizing a priceworthy construction of the current detectors with boundary value indication and OR- logic coupling of the output signals, it is possible to provide differential amplifiers, of which a respective one is connected at one of the signal-carrying conductors of the remote control installation. Moreover, for the boundary value indication, in simple situations, there is only necessary a threshold value detector connected after the differential amplifiers, and at the signal input of which there are connected the outputs of the differential amplifiers via diodes for OR- logical coupling of the output signals. In order to obtain an output signal independent of the input voltage at the signal-carrying conductors at the differential amplifiers, at each such differential amplifier it is possible to disjunctively connect the outputs of both amplifier branches by a respective diode wtih the common output. For realizing a universally employable circuit arrangement, in other words a circuit arrangement which is independent of the characteristics of the momentarily encountered remote control installation, the switching component for deriving the disturbance signals advantageously possesses window discriminating characteristics. To this end there can be provided two threshold value detectors, of which one is adjusted to the lower boundary value and the other to the upper boundary value. The outputs of the differential amplifiers are connected via diodes with the threshold value detector for the lower boundary value and via diodes connected inversely with respect thereto with the threshold value detector for the upper boundary value, and wherein the output signals of both threshold value detectors control via a disjunctive logical operation through the agency of diodes an output stage for producing the pulse-shaped disturbance signal.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
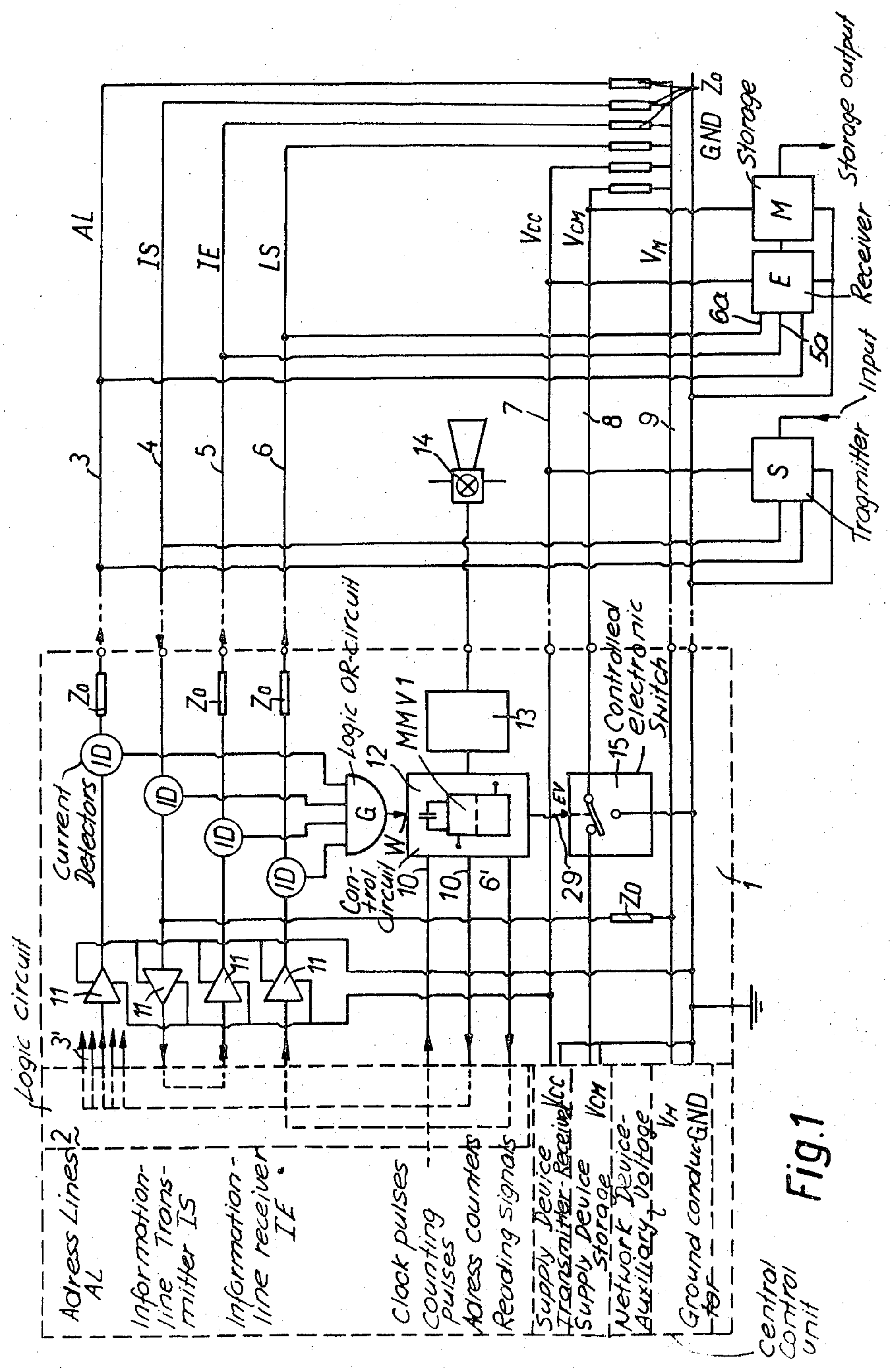
FIG. 1 schematically illustrates a block circuit diagram of a remote control installation with a central control unit and a circuit arrangement designed according to the teachings of the present invention.

In FIG. 1 there is schematically illustrated a block circuit diagram of a remote control installation in which there are connected at a central control unit 1 via a multi-line cable with the conductors 3–9 and GND the transmitter S and receiver E of, for instance, switching devices, command devices and indicating devices. For the sake of simplicity in the illustration in FIG. 1 there has only been depicted one transmitter S and one receiver E. The transmitter S could have associated therewith, for instance, a pushbutton as the command device and the receiver E a switching device (for instance a relay), and it is assumed that by pressing the buttons arranged at a command console the remotely located switching device should be actuated. Although a transmitter S can have associated therewith a number of receivers E, it is generally conventional to provide only one receiver for each transmitter. The coordination of the transmitters and receivers occurs by calling in conventional manner by means of address signals, wherein from the central control unit 1 signals characterizing in cyclic sequence binary numbers are delivered to address lines or conductors 3 and the transmitter and receivers possess address units which are connected to the address lines or conductors 3. For each operatively associated transmitter-receiver pair the address units thereof are adjusted or set to the same address.

In FIG. 1 for the sake of clarity there has been specifically depicted, of the five address lines which have been indicated by the arrows 3′, only one address line 3. As soon as the address lines or conductors 3 carry the signal combination for the address of a transmitter S such delivers the signal present at its transmitter input, which for example under consideration can be generated by depressing a key or button, in the form of transmitter-information signal to the transmitter-information line or conductor 4. By means of the transmitter-information line or conductor 4 the signal arrives at the central control unit 1 where it is checked-out or controlled and subsequently delivered to a receiver-information conductor or line 5. Additionally there is delivered from the central control unit 1 a reading signal to the reading signal line or conductor 6. The inputs 5*a* and 6*a* of the receiver E are connected to the receiver information line 5 and to the reading line or conductor 6 respectively. Now, at the receiver E energized by the same combination of address signals, the information signal is stored in a remanent storage or store M until this address appears the next time and then is delivered via the storage output to the switching device for actuating a switch. For amplifying the signals, the signal-carrying conductors 3–6 are in circuit with transistor amplifiers 11.

Generation of the address signals and the reading signals as well as the control of the transmitter-information signals occurs in a logic circuit 2 which contains an address counter and is controlled by clock pulses. The central control unit 1 furthermore contains a storage device which delivers the operating voltage $V_{CC}$ for the transmitter S and the receiver E and the storage M to a transmitter-receiver-supply conductor 7, and supplies a storage-supply conductor 8, and in the exemplary embodiment under consideration a network device for generating an auxiliary voltage $V_M$ with respect to null potential which is connected at the common ground conductor GND. The conductors 3–8 are connected with the conductor 9 carrying this auxiliary voltage $V_M$ via appropriate terminating resistors, wherein, for instance, for symmetrical signals the auxiliary voltage $V_M$ amounts to one-half of the operating voltage $V_{CC}$. Such type remote control installation has been described in detail in Swiss patent 494,485, and in this disclosure it only serves as an example of the use of the inventive circuit arrangement for the undisturbed transmission and storage of information signals at which the construction principles and mode of operation will be described in greater detail.

The conductors or lines 3–9 which have been assembled into a cable are terminated at their ends by the relevant wave or characteristic impedance $Z_o$ of the conductor. At the central control unit 1 there are likewise terminated the signal-carrying conductors 3–6 by means of their characteristic impedances $Z_o$. If disturbances arise, then disturbance currents are induced in the conductor loops and during the operation of the installation there flows through the signal conductors, apart from the rates currents of known current intensity, also disturbance currents of unknown intensity and direction. At each of the signal-carrying conductors 3–6 there is connected a current detector ID. The current detectors ID have a negligible internal resistance and also the output resistance of the amplifiers 11 connected with the signal-carrying conductors 3–6 is negligibly low. The current detectors ID possess window discrimination characteristics and deliver a binary output signal O or L, wherein their sensitivity is adjusted, for instance, such that for critical amplitudes of the disturbance currents independent of their direction there appears an L-signal at the output of the current detector. As the current detectors ID there can be advantageously employed differential amplifiers having high in-phase suppression, the inputs of which are connected with an auxiliary resistor connected at the momentary signal-carrying conductor and following which there are connected threshold value discriminators. With the arrangement depicted in FIG. 1, the outputs of the current detectors ID are connected to the inputs of a logic OR- circuit G, the output of which accordingly indicates with an L-signal that in one or in a random number of the signal-carrying conductors 3–6 there is present an impermissible disturbance. A particularly advantageous construction of current detector with OR- logical coupling or logic operation will be described more fully hereinafter in conjunction with FIG. 2. The circuit arrangement further contains a controlled electronic switch 15, the switching path of which in the rest state of the switch connects the storage-power supply conductor 8 with the storage-supply voltage $V_{CM}$, and in the energized state or condition connects the storage-supply conductor 8 with the ground conductor GND, so that in this circuit state the storage supply is short-circuited.

At the output of the logic OR- circuit G, there is connected the control input W of a control circuit 12. This control circuit 12 contains a trigger, that is here a monostable multi-vibrator $MMV_1$ which by means of the leading edge of each L-signal appearing at the input of the control circuit 12 from the OR- circuit G, delivers a pulse at the output of a duration corresponding to the time-constant $t_1$ of the multi-vibrator $MMV_1$ and which is switched such that when a further L- signal follows an L- signal in the time $t_s \leqq t_1$ there begins the output signal associated therewith without flipping or switching of the multi-vibrator. The output pulse of the monostable multi-vibrator $MMV_1$ controls via matching switch elements the electronic switch 15 to assume a switching state in which the storage supply is short-circuited and blocks; if necessary via matching switching elements, at the central control unit 1 the delivery of address signals in that the infeed of counting pulses into the address counter is interrupted as is also the further transmission of the information signals to the receivers in that the delivery of reading signals to the reading signal line or conductor 6 is interrupted, and this has been indicated in FIG. 1 by the clock pulse line or conductor 10 leading to the control circuit 12 and the counting pulse conductor 10′ leading away from such circuit and the reading signal conductor 6′ also leading away from such circuit. Upon the occurrence of an undesired pronounced disturbance the operation of the remote control installation is interrupted for the duration of the disturbance by the circuit arrangement. The remanent storage M of the receiver E retains its switching state since its supply is short-circuited by the electronic switch 15. Also the address counter retains the state it had directly prior to the disturbance, since it no longer receives any counting pulses. If the disturbance disappears then there appears at the input W of the control circuit 12 and emanating from the output of the OR- circuit G a O- signal. Consequently, monostable multi-vibrator $MMV_1$ resets or switches-back after the time $t_1$, whereby, by means of the electrical switch 15, the storage supply is again switched-on and the blocking action removed, so hat the addres counter further indexes and reading signals are again delivered. In other words, upon disappearance of the disturbance, the circuit arrangement ensures that the remote control installation will again resume its operation with the addresses which have been called-up prior to the disturbance. For the purpose of reporting disturbances of longer duration, there is provided an alarm circuit or alarm 13 by means of which there can be turned-on an acoustical and/or optical alarm device 14, if the monostable multi-vibrator $MMV_1$ of the control circuit 12 does not reset upon expiration of a predetermined time-span.

Figures 2, 2A, 2B, 2C:
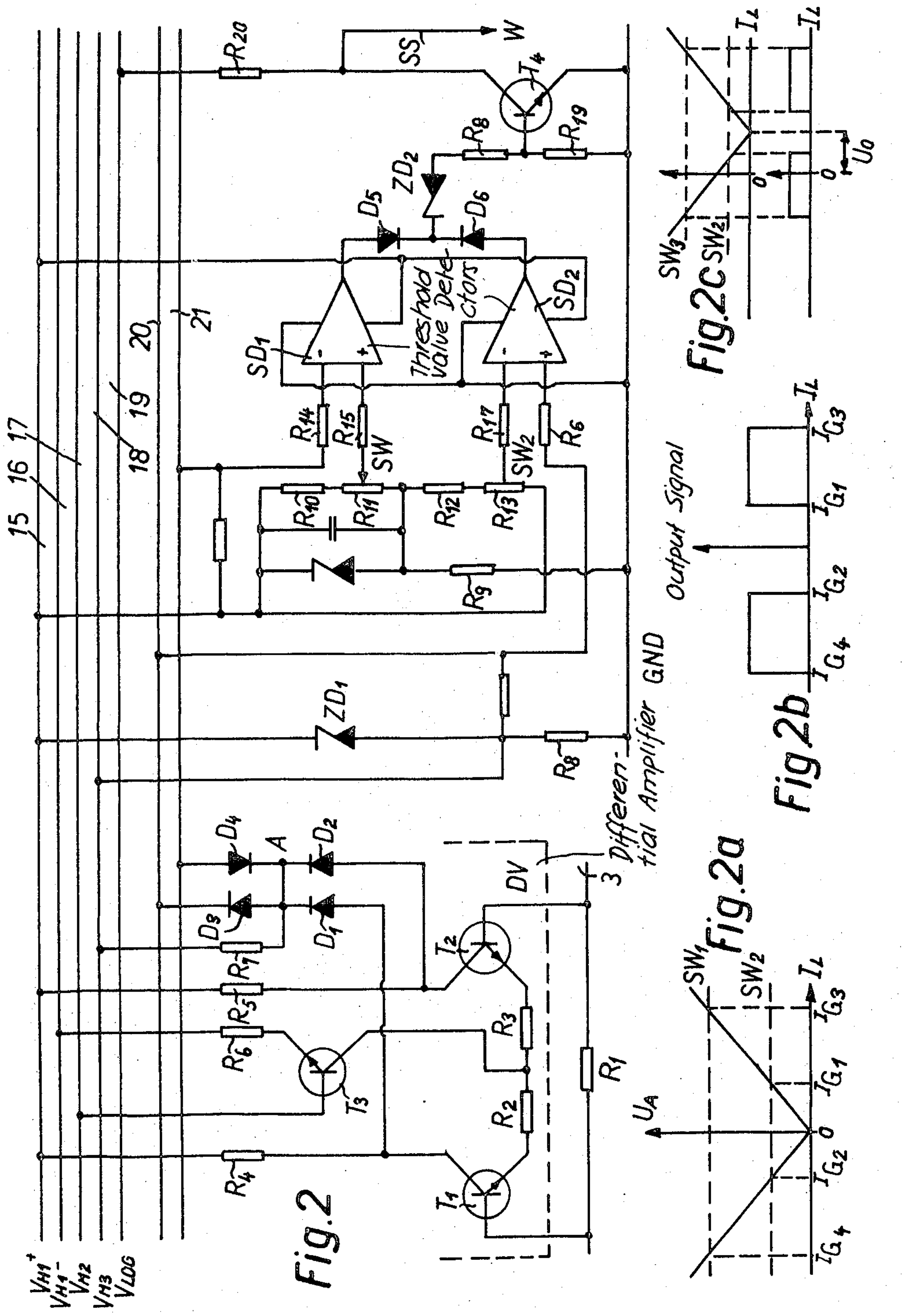
FIG. 2 is a circuit diagram of a differential amplifier with window discrimination characteristics.
FIGS. 2*a to 2c* illustrate respective graphs or diagrams for the differential amplifier of the arrangement of FIG. 2.

An embodiment of circuitry for a current detector with logic OR- circuit has been depicted in FIG. 2. In the conductor, for instance an address conductor or line 3 which is to be monitored, there is connected an auxiliary resistor $R_1$, at the ends or terminals of which there are connected at the conductors 3 the inputs of a differential amplifier DV. The differential amplifier DV contains two npn- transistors $T_1$ and $T_2$, the collector resistors $R_4$ and $R_5$ of which are connected to a conductor 15 carrying a positive operating voltage $V_{H1+}$ and both of whose emitter resistors $R_2$ and $R_3$ are connected, via the collector-emitter path of a further npn-transistor $T_3$ and its emitter resistor $R_6$, with a conductor 16 carrying negative operating voltage $V_{H1-}$. The transistor $T_3$, the base of which is connected to a conductor 17 carrying an auxiliary voltage $V_{H2}$ which is positive with respect to the voltage $V_{H1-}$, serves as a constant current source. The collectors of both transistors $T_1$ and $T_2$ are connected via a respective diode $D_1$ and $D_2$ with the output A of the differential amplifier, which output is connected via a resistor $R_7$ with a conductor 18 carrying a reference voltage $V_{H3}$. For generating the reference voltage the conductor 18 is coupled via a reference diode $ZD_1$ with the conductor or line 15 carrying the positive operating voltage $V_{H1+}$ and via a resistor $R_8$ with the ground conductor GND. Owing to the disjunctive logical coupling via the diodes $D_1$ and $D_2$, the output voltage of the differential amplifier, independent of the current direction and the input potential, increases with increasing current intensity in the conductor 3.

The operating characteristics of the differential amplifier DV have been depicted in FIG. 2*a*, in which there has been plotted the output voltage $U_A$ as a function of the current intensity $I_L$. The slope or steepness of both characteristic line branches is determined by the gain. For example, in the case of for instance symmetrical binary signals, the amplitude of the disturbance currents in both current flow directions should not exceed a predetermined lower boundary value $I_G$ (FIG. 2*a*, $I_{G1}=-I_{G2}$), so that there is guaranteed clearly discernible signal transmission. The current intensity regions beneath the negative and above the positive boundary values $I_{G2}$ and $I_{G1}$ respectively, so-to-speak are forbidden zones and disturbance-current amplitudes located therein, as mentioned, are indicated by an L signal at the output of the logic OR- circuit G (FIG. 1). A window discrimination characteristic with positive and negative values for a lower and upper boundary $I_{G1}$, $I_{G2}$, and $I_{G3}$, $I_{G4}$ respectively, can be attained for the differential amplifier DV by subsequently connecting two threshold value detectors $SD_1$ and $SD_2$. For correlating the output signal of the differential amplifier DV with respect to the upper and lower boundary value, its output A is connected, via a diode $D_3$ which is connected in its conducting or throughput direction with a conductor 20, and via a diode $D_4$ which is connected in a blocking direction with a conductor 21. The positive input of the threshold value detector $SD_2$ for the upper boundary value is connected via an input resistor $R_{16}$ with the conductor 20 and at the conductor 21 there is connected via an input resistor $R_{14}$ the negative input of the threshold value detector SDhd 1 for the lower boundary. For tapping-off the threshold value voltages $SW_1$, $SW_2$, there is provided a voltage divider consisting of resistors $R_9$ to $R_{13}$, and containing two potentiometers $R_{11}$ and $R_{13}$.

At the respective center tap of the potentiometers $R_{11}$ and $R_{13}$ there is connected via the input resistors $R_{15}$ and $R_{17}$, the positive input of threshold value detector $SD_1$ and the negative input of the threshold value detector $SD_2$ respectively. The outputs of the two threshold value detectors $SD_1$ and $SD_2$ are connected with the ground conductor GND via a respective diode $D_5$ and $D_6$, a reference diode $ZD_2$ provided for matching purposes, and has a base voltage divider $R_{18}$, $R_{19}$ for the output transistor $T_4$. The collector of the transistor $T_4$, at which there is removed the control signal SS, is connected via a resistor $R_{20}$ with the positive signal voltage $V_{Log}$ carried by the conductor 19.

The reference voltage $V_{H3}$ is set such that, when no current flows in the signal-carrying conductor, the threshold value detector $SD_1$ for the lower boundary possesses at its output $V_{H1+}$ voltage so that the transistor $T_4$ becomes conductive, and as the control signal SS there is obtained a null potential signal. If in the signal-carrying conductor the current intensity is greater than the lower boundary value, then the negative input of the threshold value detector $SD_1$ (via diode $D_4$, conductor 21, input resistor $R_{14}$) is more positive than the positive input at which there is applied the threshold value voltage $SW_1$ for the lower boundary value, and its output carries null potential, so that the output transistor $T_4$ blocks and there is present at its output the control signal L. At the threshold value detector $SD_2$ for the upper boundary value its output voltage is reversed in accordance with the window discriminating characteristics, in other words null potential for disturbance currents which are beneath the upper boundary value. FIG. 2*b* depicts such window discrimination or discriminating characteristics in the form of a graph in which the output signal has been plotted as a function of the current intensity in a conductor carrying symmetrical signals.

The accommodation or matching to the momentary data of the individual signal-carrying conductors 3–6 (FIG. 1) occurs by changing the characteristics of the differential amplifier DV. By increasing the gain and with fixedly retained threshold value voltages $SW_1$, $SW_2$, the region for the impermissible current intensities is narrowed or attenuated and the boundary values for the current intensities move closer to the null point, since as mentioned, with greater gain the characteristic lines of FIG. 2a possess greater slope. In the case of asymmetrical information signals the region can be displaced with respect to the null point by offset balancing or compensation (FIG. 2*c*). Gain and offset voltage can be adjusted or set by the emitter resistors $R_2$, $R_3$, since for the differential amplifier DV as a coarse approximation there can be expressed with the following equations the gain $v \approx (1/R_2 + R_3)\ k_1\ (k_1 = \text{constant})$ and the offset voltage by $U_o \approx (R_3 - R_2) k_2\ (k_2 = \text{constant})$, and wherein $R_2$ and $R_3$ represent values for both emitter resistors of the amplifier transistors $T_1$ and $T_2$.

Since for the operation of the circuit arrangement it is without significance in which conductor induced disturbance currents bring about critical current intensities, all differential amplifiers of the installation advantageously only have connected thereafter two threshold value detectors $SD_1$ and $SD_2$. The diodes $D_3$ and $D_4$ of the differential amplifier DV which are connected to the conductors 20 and 21 (FIG. 2) respectively, form the OR- logical circuit G (FIG. 1) of the current detector-output signals. The control signals SS are delivered to the control input W of the control circuit 12 (FIG. 1), which has the function of immediately short-circuiting the storage power supply upon the occurrence of a disturbance, blocking the reading signals and the counting signals for the address counter, and after the decay of the disturbance again switching-on the storage supply and again removing the blocking action, and specifically after a predetermined switching time plan which is determined by the characteristics of the remanent storage and by the period and pulse duration of the reading- and counting signals, so that the remote control installation after the disappearance of the disturbance again begins to function with the proper rhythm or timing cycle.

Figures 3, 4:
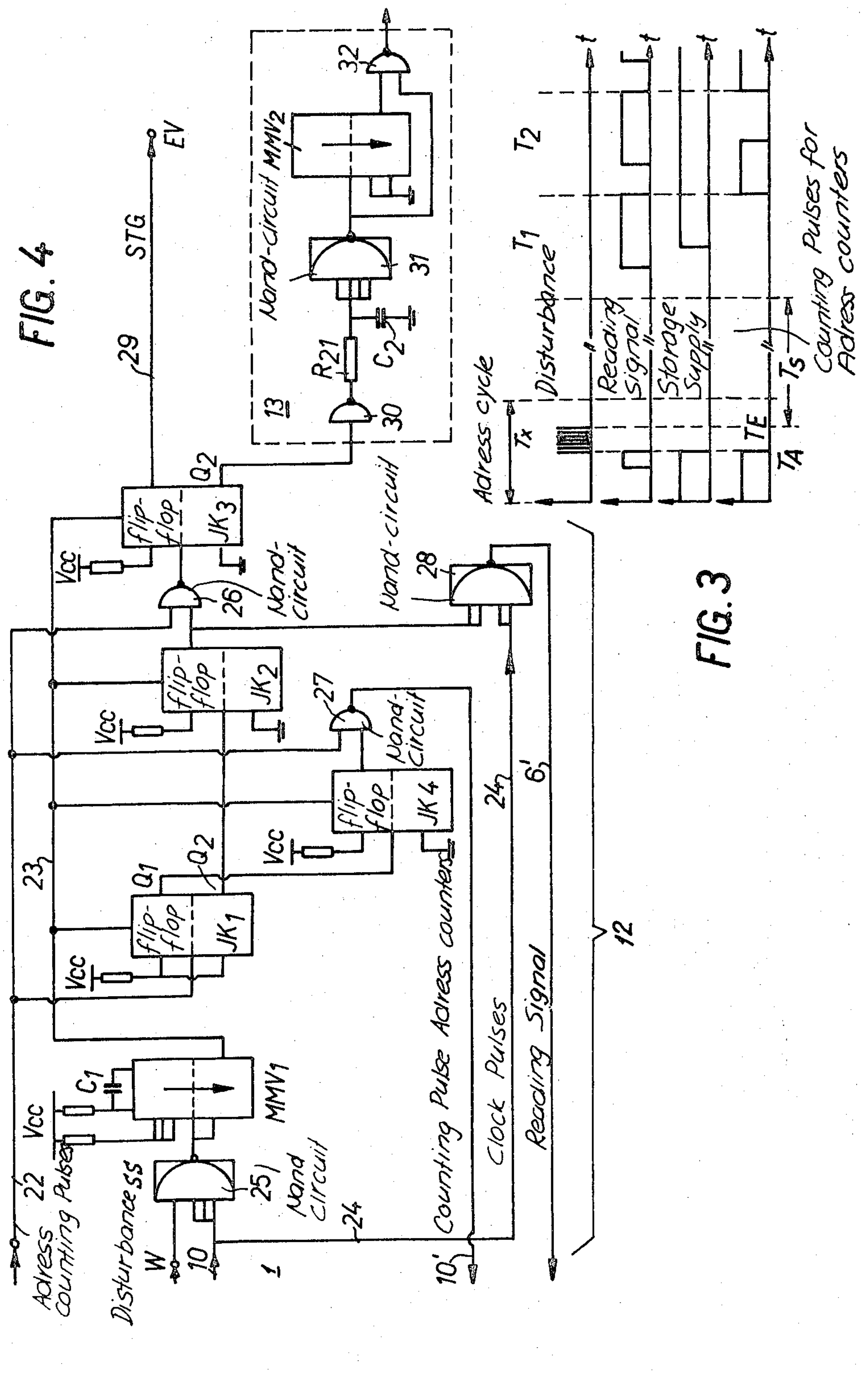
FIG. 3 is a switching-time graph for the circuit arrangement of FIG. 1.
FIG. 4 is a block circuit diagram of a control circuit of the circuit arrangement of FIG. 1.

In FIG. 3 there has been plotted by way of example a switching-time diagram in which there is plotted along the time axis *t* a disturbance, reading signals, the storage supply as well as counting pulses for the address counters. At the beginning of the disturbance, at the time $t_A$, there is interrupted the delivery of reading signals and counting signals and the storage supply is switched-off, and at the time $t_E$ the disturbance which is present at the cycle $T_x$ of the address counter, has decayed. After decay of the disturbance it is initially necessary to wait until the activation time of the remanent storage, for instance a bistable flip-flop or trigger relay of the receiver E, has expired, so that in any case there can be recorded an information signal. This activation time, which at the same time constitutes a safety time, has been depicted in FIG. 3 by reference character $T_S$. After expiration of the time $T_S$ there becomes functional with the next clock pulse of the central control unit the reading signal with the inverted pulse, wherein there is insured that the reading pulse in any event has the proper duration. In order that the current detectors, upon again switching-in the storage supply, do not report any erroneous disturbance owing to over-response in the line or conductor, the storage supply is switched-in with a time-delay corresponding to one-half of the period of a counting pulse. One counting pulse after expiration of the time $T_S$ the address counter also begins to further count.

FIG. 4 shows a circuit diagram of an exemplary embodiment of a control circuit 12 which carries out such switching program. The illustrated control circuit 12 contains a monostable multi-vibrator $MMV_1$, thhe time-constant of which, which has been indicated in FIG. 4 by the capacitor $C_1$, is equal to the waiting time $T_S$. Since the disturbances as a rule occur in groups or bunches, there is employed a monostable multi-vibrator which can be again triggered with each input pulse. The input of the monostable multivibrator $MMV_1$ has arranged forwardly thereof and in circuit therewith a NAND-circuit 25 possessing Schmitt trigger-characteristics, the one input of which forms the control input W of the control circuit 12 and at its other input there are delivered clock pulses of the central control unit. If a disturbance is reported by a O →L - transition at the input W, then the monostable multi-vibrator $MMV_1$ responds. By means of the monostable multi-vibrator $MMV_1$ four JK-master-slave-flip-flop JK1 to JK4 are set, wherein a respective one of their inputs is connected via a conductor with the output of the multi-vibrator $MMV_1$. The first flip-flop JK1 upon again switching-in in the remote control installation serves as an internal clock generator for the control circuit. By means of a conductor 22 it receives the counting pulses for the address counter and its J- and K- input always carries L- signals, so that when it is not set by the output signal of the monostable multi-vibrator $MMV_1$, it shifts into counting signals during each L → O transition. The second flip-flop $JK_2$ serves to control the reading signals. At the input side it is connected to the conductor 23 carrying the output signals of the monostable multi-vibrator $MMV_1$ and with the $Q_2$ - output of the first flip-flop $JK_1$ and its output is connected with a NAND- circuit 28 which receives at its other input, via the conductor 24, the clock pulses from the central control unit 1. With the aid of the clock pulses there is generated at the central control unit 1 the reading signal. Upon the occurrence of a disturbance the flip-flop $JK_2$ delivers a null signal to the NAND- circuit 28, so that at its output there always is present an L- signal and the clock pulses become ineffectual. At the output of the flip-flop $JK_2$ there is connected a NAND- circuit 26, the other input of which receives counting pulses via the conductor 22. At the output of the NAND- circuit 26 there is connected the flip-flop $JK_3$. Upon the appearance of a disturbance there appears at an output of the flip-flop $JK_3$, for instance a null signal which is delivered via a connection line or conductor 29 to the electronic switch 15 in order to energize such to a state where it short-circuits the storage supply. The other output of the flip-flop $JK_3$ leads to the alarm circuit 13. If the waiting time TS has expired without further disturbances, then the output of the flip-flop $JK_2$ switches to the L- signal and with the next successive counting pulse transforms at the output of the NAND- circuit 26 the L- into an O- signal, by means of which transition the flip-flop $JK_3$ is immediately switched and there appears at the conductor 29 and L- signal. The required slow turning-on of the storage supply is attained with this embodiment by the electronic switch 15. The flip-flop $JK_4$ for controlling the address-counter pulses is connected by means of its setting input with the output $Q_1$ of the flip-flop $JK_1$. The output of the flip-flop $JK_4$ is again connected with a NAND- circuit 27, the other input of which now however receives via the conductor 22 address-counting pulses. During a disturbance, the flip-flop $JK_4$ is reset by the output signal of the monostable multi-vibrator $MMV_1$ and the null signal at its output blocks and NAND- circuit 27, so that there are not passed any counting pulses. The release of the counting pulses which has been delayed by one clock time is obtained by the connection of the flip-flop $JK_4$ at the $Q_1$- input of the flip-flop $JK_1$ and the NAND- logical operation.

The alarm device 14 (FIG. 1) should only respond when the storage voltage remains switched-out either longer than its predetermined period of time, for instance 100 msec, or when the ratio of the switch-on time to the switch-off time of the storage supply is considerably smaller than 1. In order to attain such, the alarm circuit 13 contains a low-pass filter arrangement $R_{21}$, $C_2$ and a monostable multi-vibrator $MMV_2$. In the illustrated exemplary embodiment, the alarm circuit 13 is connected to the $Q_2$- output of the flip-flop $JK_3$. Accordingly, the low-pass filter arrangement, containing the resistor $R_{21}$ and the capacitor $C_2$, has connected forwardly thereof an inverter 30. A NAND- circuit 31 with Schmitt-trigger characteristics connects the low-pass filter arrangement $R_{21}$, $C_2$ with the input of the monostable multi-vibrator $MMV_2$. At the input and the output of the monostable multi-vibrator $MMV_2$, there is connected a respective input of a NAND- circuit 32, the output of which is coupled with the alarm device 14 (FIG. 1).

Figures 5, 5A:
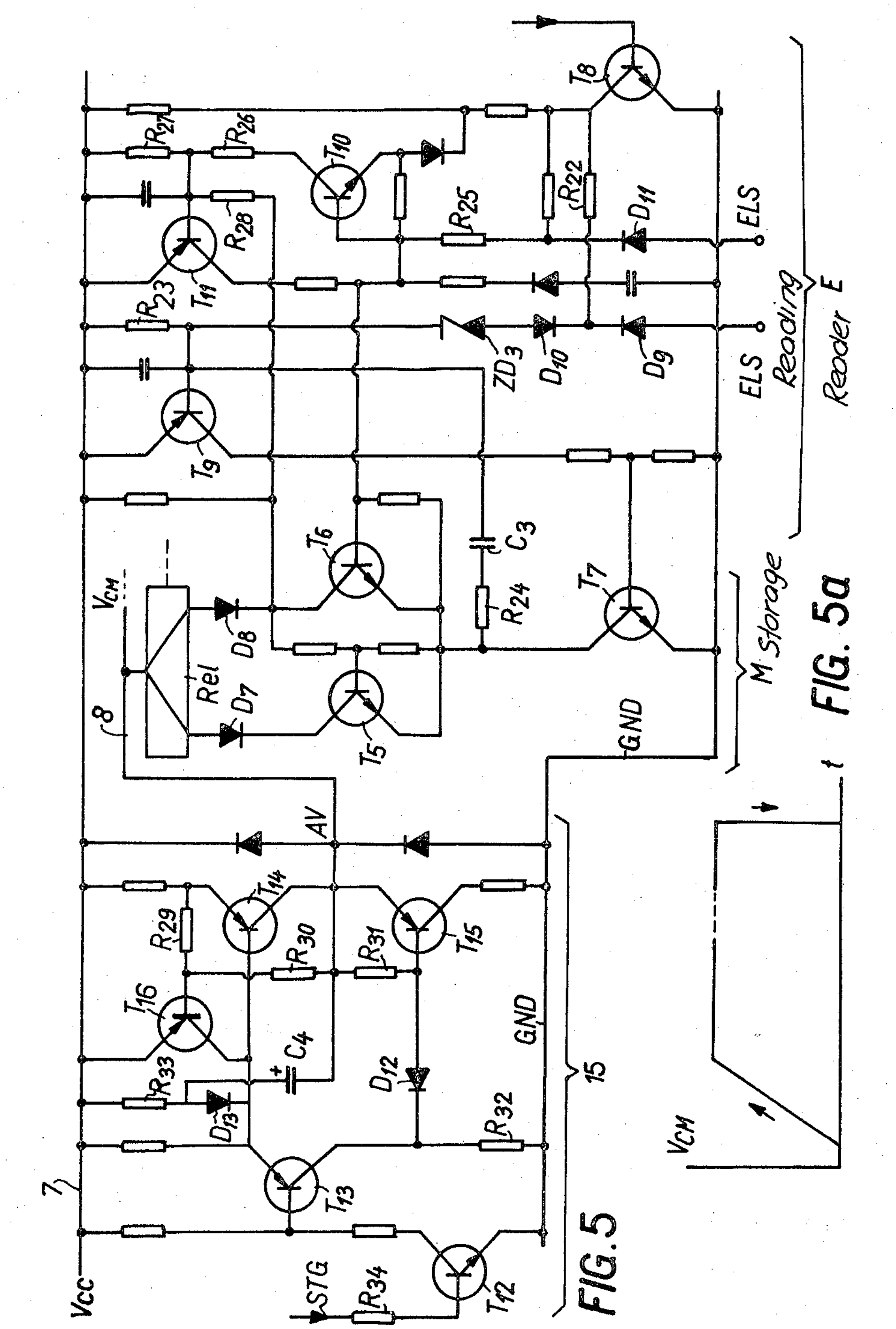
FIG. 5 is a circuit diagram of a power amplifier serving as an electronic switch in the circuit arrangement of FIG. 1 together with a bistable flip-flop relay as a remanent storage and the circuit for a receiver of a remote control installation.
FIG. 5*a* is a time diagram or graph representing the switching-on and switching-off of the storage supply voltage.

FIG. 5 illustrates a circuit diagram for a receiver E with a bistable flip-flop relay as a remanent storage M, the supply of which is controlled by the disturbance signals STG via the electronic switch 15 which in this case has been shown, for instance in the form of a power amplifier. Both of the coils or windings of the bistable flip-flop relay Rel are connected by means of one of their ends at the storage-supply conductor 8 and both of their other ends are connected via a respective diode $D_7$ and $D_8$, the collector-emitter path of a respective transistor $T_5$ and $T_6$ and conjointly via the collector-emitter path of a transistor $T_7$, with the ground conductor GND.

At the receiver E there has been conveniently omitted the address unit. The input transistor $T_8$ becomes conductive as soon as there is reported by the address unit the occurrence of the address signals which appear at the address conductors and which are infed or supplied to the receiver. The input ELS for the reading signals is connected via a diode $D_9$ as well as a resistor $R_{22}$ with the collector of the input transistor $T_8$ and also via a diode $D_{10}$, a reference diode $VD_3$ and the base resistor $R_{23}$ of a further transistor $T_9$, with the supply conductor 7 which carries the positive supply voltage $V_{CC}$. The transistor $T_9$ controls the transistor $T_7$ which is connected in circuit with the relay circuit, and the collector of which is connected via a RC- element $R_{24}$, $C_3$ with the base of the transistor $T_9$. Hence the transistor $T_7$ only then can become conductive if there is present for the receiver the address (transistor $T_8$ is conductive) and at the same time there appears at the reading signal input ELS an O- signal as the reading signal. The input EIS for the information signal is connected via a diode $D_{11}$ and a resistor $R_{25}$ with the base of a transistor $T_{10}$ which controls a transistor $T_{11}$ via a voltage divider $R_{26}$, $R_{27}$. Both of the transistors $T_5$ and $T_6$ in the relay circuit are controlled by the transistor $T_{11}$. Whether transistor $T_5$ or transistor $T_6$ is conductive, that is to say, whether the one or the other coil or winding of the relay Rel is energized, is dependent upon whether during the occurrence of the address (input transistor $T_8$ is conductive) the transistor $T_{10}$ connected to the information signal-input EIS is switched into its conductive state by an information signal. When the transistor $T_{10}$ becomes conductive, then the transistor $T_6$, controlled by the transistor $T_{11}$, becomes conductive and owing to the feedback via the resistor $R_{28}$ a brief pulse at the transistor $T_{10}$ is sufficient to switch the transistor $T_6$ into its conductive state. This state is then again only extinguished when the transistor $T_7$ begins to block, wherein the duration of the conductive state of the transistor $T_7$ is determined by the time-constant of the RC- element $R_{24}$, $C_3$ at the feedback branch leading to the transistor $T_9$ and is independent of the duration of the address signal which only prevails for a very brief period of time. Owing to this monostable circuit, which contains the transistors $T_7$, $T_9$ and the RC- element $R_{24}$, $C_3$, the transistors of the receiver E are only conductive for a brief period of time after the appearance of the address signal and during the remaining time are always blocked. Upon the occurrence of a disturbance the supply of the relay Rel is briefly closed. In the presence of extremely pronounced disturbances, it would be indeed possible for the monostable circuit to be triggered and the transistors to be placed into their conductive state, yet owing to the short-circuited relay supply it is not possible for any control current to flow through the relay winding or coil so that the stored information is retained and is not affected by the disturbance.

With this exemplary embodiment, there is employed for the control of the relay supply a power amplifier as the electronic switch 15. As depicted in FIG. 5, the power amplifier possesses, for instance, a pre-amplifier stage with a npn-transistor $T_{12}$, a driver stage containing a pnp-transistor $T_{13}$ and a push-pull terminal stage containing both of the pnp- transistors $T_{14}$ and $T_{15}$ which are switched in the conventional manner. For realizing a current limiting effect with descending characteristics, there is provided a further pnp-transistor $T_{16}$, the collector-emitter path of which connects the base of the final amplifier-transistor $T_{14}$ with the positive operating voltage $V_{CC}$, and the base of which is connected via a resistor $R_{29}$ with the emitter of the final amplifier-transistor $T_{14}$, via resistor $R_{31}$ with the base of the transistor $T_{15}$, and finally via a diode $D_{12}$ and the collector-resistor $R_{32}$ with the ground conductor GND. Between the amplifier output AV and the supply conductor 7 carrying the positive operating voltage $V_{CC}$ there is connected a series RC-element consisting of the resistor $R_{33}$ and the capacitor $C_4$, which is coupled by means of a diode $D_{13}$ with the base of the final amplifier-transistor $T_{14}$.

During normal operation without disturbances, there is present at the base of the pre-amplifier stage-transistor $T_{12}$ the L- signal, the transistors $T_{12}$, $T_{13}$, $T_{14}$ are in a conductive state and the transistors $T_{15}$, $T_{16}$ are blocked, the capacitor $C_4$ of the RC-element $R_{33}$, $C_4$ is charged and the conductor 8 is connected via the transistor $T_{14}$ with the conductor 7 which carries the operating voltage $V_{CC}$, which serves as the storage supply. If a disturbance arises, then the base of the pre-amplifier stage-transistor $T_{12}$ receives via its resistor $R_{34}$ from the control circuit 12 (FIG. 4) an O-signal and in the final amplifier stage both of the transistors $T_{14}$ and $T_{15}$ switch into their other state, wherein the RC-element $R_{33}$, $C_4$ owing to the diode $D_{13}$ is without influence upon the switching operation, so that the storage-supply conductor 8 is applied in less than, for instance, 1 $\mu$sec to the ground conductor GND by means of the conductive transistor $T_{15}$. This short-circuit remains for such time until after disappearance of the disturbance the base of the transistor $T_{12}$ again receives the L- signal. Upon switching of the final amplifier stage-transistors $T_{14}$ and $T_{15}$, the RC-element $R_{33}$, $C_4$ is however effective so that at the amplifier output AV and therefore at the storage-supply conductor 8 the voltage increases in the time-span of one-half of a period of the counting pulse to the final value. FIG. 5a illustrates in the time graph or diagram the slow ascent of the storage supply voltage $V_{CM}$ during re-switching-in of the system and after the decay of a disturbance and the abrupt drop thereof during the occurrence of a disturbance.

While there is shown and described present preferred embodiments of the invention, it is to be distinctly understood that the invention is not limited thereto, but may be otherwise variously embodied and practiced within the scope of the following claims. Accordingly,

What is claimed is:

1. A circuit arrangement for the undisturbed transmission and storage of electrical information signals at a remote control installation, comprising addressed transmitter means and receiver means, said addressed receiver means possessing addressed remanent intermediate storage means, a central control unit, signal-carrying conductors for connecting said transmitter means and receiver means with said central control unit, said central control unit possessing a logic circuit for the delivery of address signals and the transmission of information signals received by the transmitter means to the remanent intermediate storages of the receiver means, a current detector connected with each of the signal-carrying conductors, said conductors being terminated at their ends by their characteristic impedance, means for providing boundary value indication and logical OR-coupling for output signals of the current detectors in order to obtain a pulse-shaped disturbance signal whenever even in only one of said conductors the current intensity falls below a lower boundary value or exceeds an upper boundary value, a controllable electronic switch in circuit with a supply conductor for the remanent intermediate storage means of said receiver means, a control circuit provided for said electronic switch and said logic circuit of the central control unit, said control circuit being influenced by the disturbance signals, said control circuit upon the presence of a disturbance signal acting upon the electronic switch to temporarily short-circuit the supply conductor for the remanent intermediate storage means of said receiver means and further acting upon the logic circuit of the central control unit so as to interrupt the delivery of the address signals and the further transmission of the information signals.

2. The circuit arrangement as defined in claim 1, wherein said control circuit contains a monostable trigger stage which can be re-triggered by each disturbance signal, the time-constant of said monostable trigger stage being not less than the activation time of said remanent intermediate storage means, and wherein by means of the leading edge of each output signal of the monostable trigger stage said electronic switch is controlled to short-circuit the supply conductor for the remanent intermediate storage means and said logic circuit is controlled to block the output of the address signals and the further transmission of the information signals, switching means responsive to the rear edge of the output signals of the monostable trigger stage for switching-in the supply conductor and removal of the blocking of the address signals and information signals so as to ensure for the correct cyclic placement into operation of the remote control installation after decay of the disturbance signal.

3. The circuit arrangement as defined in claim 2, wherein at the remote control installation at the central control unit thereof counting pulses for an address counter are obtained from clock pulses, logic circuit means arranged ahead of and in circuit with said monostable trigger stage in order to obtain trigger pulses for said monostable trigger stage, said trigger pulses being obtained by a conjunctive logical coupling of a disturbance signal with the clock pulses of the central control unit, and said switching means responsive to the rear edge of the output signals of the monostable trigger stage being controlled by said address counting pulses.

4. The circuit arrangement as defined in claim 3, including a conjunctive logic circuit for conducting the address counting pulses of the central control unit, said conjunctive logic circuit being connected in circuit with the output of the monostable trigger stage, the output signals of the monostable trigger stage acting upon the conjunctive logic circuit in a manner to block throughpassage of the address counting pulses.

5. The circuit arrangement as defined in claim 4, for a remote control installation where the further transmission of information signals occurs by reading signals associated therewith and the reading signals are obtained at the central control unit from clock pulses, the improvement comprising a conjunctive logic circuit coupled with the output of the monostable trigger stage for conducting the clock pulses for generating the reading signals, said conjunctive logic circuit being acted upon by the output signal of the monostable trigger stage in such a manner as to block the through passage of the clock pulses.

6. The circuit arrangement as defined in claim 5, wherein the control circuit contains a first bistable flip-flop stage having a setting input, said first bistable flip-flop stage being triggered by the address counting pulses, said first bistable flip-flop stage switching in the presence of each forward and rear edge of the address counting pulses, said conjunctive logic circuit for the address counting pulses and said conjunctive logic-circuit for the clock pulses employed for generating the reading signals each having connected forwardly thereof a respective further bistable flip-flop stage with respective setting inputs each connected with a respective output of said first bistable flip-flop stage, the setting inputs of the three bistable flip-flop stages being connected in circuit with the output of the monostable flip-flop stage, so that upon resetting of the three bistable flip-flop stages by the forward edge of an output signal of the monostable flip-flop stage said three bistable flip-flop stages block the conjunctive logic circuits for the address counting pulses and the clock pulses and after turning-on said three bistable flip-flop stages by the rear edge of the output signal of the monostable trigger stage initially opening the conjunctive logic circuit for the clock pulses and one counting cycle later the conjunctive logic circuit for the address counting pulses.

7. The circuit arrangement as defined in claim 6, wherein the control circuit for generating control signals for the electronic switch contains an additional bistable flip-flop stage having a setting input connected with the output of the monostable trigger stage, said setting input having delivered thereto the address counting pulses in order to obtain at the output of said additional bistable flip-flop stage for the electronic switch a switch-on control signal for the switching-on the supply conductor for the remanent intermediate storage means, and wherein with the forward edge of the output signal of the monostable trigger stage said switch-on control signal is interrupted and with the rear edge of such output signal is again established, and said switching means including time-delay circuit means for delaying the establishment of said switch-on control signal.

8. The circuit arrangement as defined in claim 2, wherein an alarm circuit is connected with the control circuit, said alarm circuit containing a timing switch element and responding to control signals for the electronic switch, so that with a short-circuit of the supply conductor for the remanent intermediate storage means which lasts longer than a certain time an alarm signal is delivered.

9. The circuit arrangement as defined in claim 8, wherein the control circuit for generating control signals for the electronic switch contains a bistable flip-flop stage having a setting input connected with the output of the monostable trigger stage, said setting input having delivered thereto the address counting pulses in order to obtain at the output of said bistable flip-flop stage for the electronic switch a switch-on control signal for switching-on the supply conductor for the remanent intermediate storage means, and wherein with the forward edge of the output signal of the monostable trigger stage said switch-on control signal is interrupted and with the rear edge of such output signal is again established, and said switching means including time-delay circuit means for delaying the establishment of said switch-on control signal, and said alarm circuit comprises as the timing switch element a monostable trigger stage and a low-pass filter arrangement which is connected with another output of said bistable flip-flop stage.

10. The circuit arrangement as defined in claim 7, wherein the electronic switch comprises a transistorized power amplifier containing a push-pull terminal stage, in the one amplifier branch thereof there being connected a RC-element coupled by means of a diode for flattening the ascending output signal edge.

11. The circuit arrangement as defined in claim 1, wherein the arrangement of the current detectors and the means for providing boundary value indication and logical OR-coupling of the output signals embodies a number of differential amplifier means, each of which is connected to one of the signal-carrying conductors, and for said boundary value indication there is provided at least one threshold value detector having a signal input, diode means for connecting said signal input with the outputs of the differential amplifier means for the logical OR-coupling of the output signals.

12. The circuit arrangement as defined in claim 11, wherein each of the differential amplifier means have two amplifier branches, the outputs of both amplifier branches being disjunctively connected via a respective diode with a common amplifier output in order to obtain an output signal which is independent of the input voltage at the signal-carrying conductor.

13. The circuit arrangement as defined in claim 12, wherein said threshold value detector serves to detect a lower boundary value, a further threshold value detector for detecting an upper boundary value in order to obtain window discrimination characteristics for the current detectors, the outputs of the differential amplifier means being connected via further diode means with a signal input of the threshold value detector for the upper boundary value, additional diode means for disjunctively coupling the output signals of the threshold value detectors, an ouptut stage for producing the pulse-shaped disturbance signal, said output signals of the threshold value detectors controlling said output stage.

* * * * *